Figure 1:
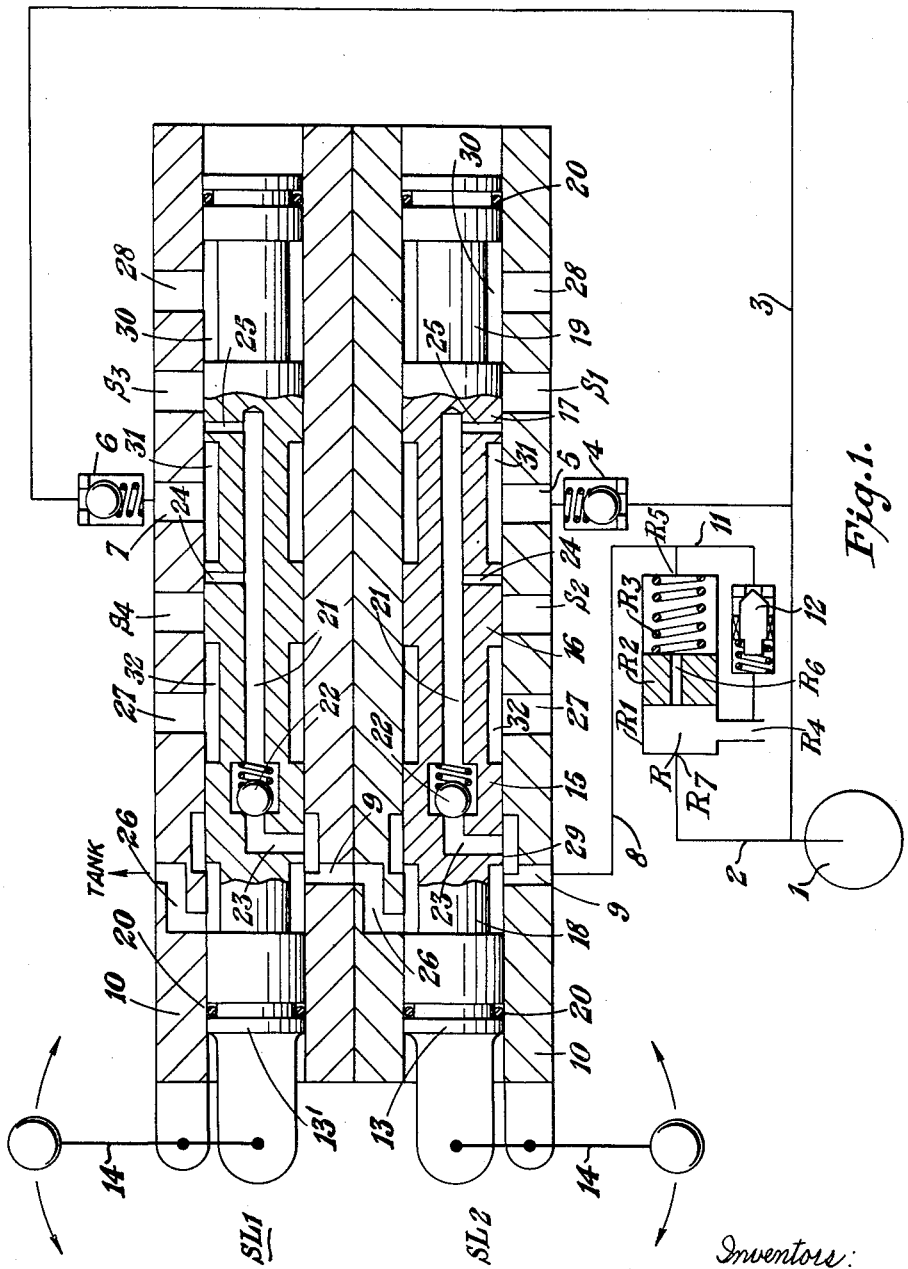

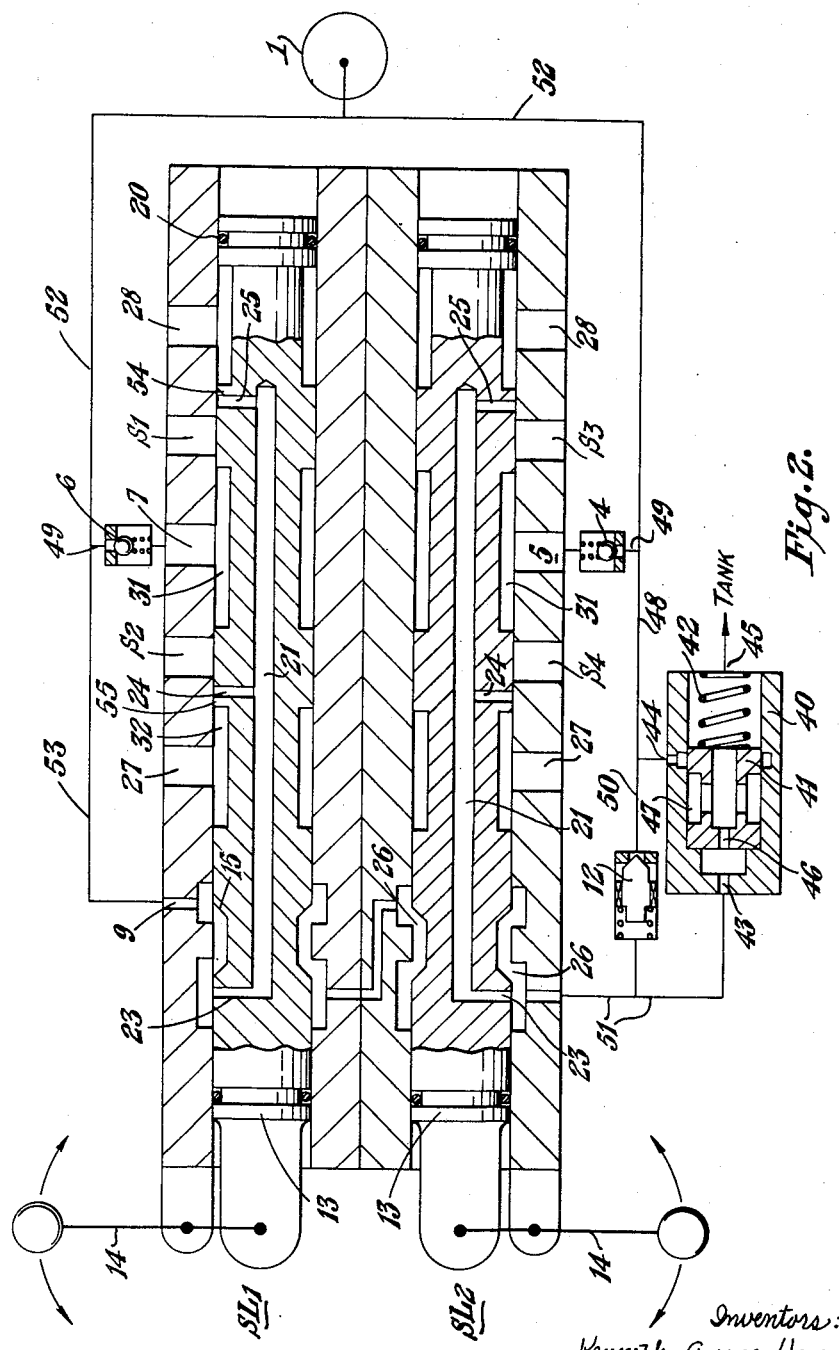

United States Patent Office 3,060,967
Patented Oct. 30, 1962

3,060,967
SELECTOR VALVE MECHANISM
Kenneth George Hancock, Walton, Warrington, and Donald Marsh Bruce, Grappenhall, near Warrington, England, assignors to Electro-Hydraulics Limited, Warrington, Lancashire, England, a corporation of the United Kingdom
Filed Aug. 19, 1960, Ser. No. 50,727
Claims priority, application Great Britain Sept. 4, 1959
12 Claims. (Cl. 137—621)

This invention relates to selector valve mechanisms such as are capable of use in hydraulic systems for actuating one or more desired services; such services may for example include hydraulically operated services normally provided in aircraft or in fork life truck or in other industrial uses.

The selector valve mechanism according to this invention is employed in systems which utilize fixed delivery pumps for supplying the requisite fluid under pressure to the system from a storage device and with such arrangements it is necessary to off-load the pumps when the circuit selectors are in neutral position.

It is an object of this invention to provide an improved selector valve mechanism whereby one or more services, such as one or more hydraulic jacks, may be operated simultaneously and/or independently of each other in such a way that the power absorbed within the system in which the valve selector mechanism is included is always the minimum necessary to operate the service required.

The use of the selector valve mechanism can also obtain improved metering of the pressure fluid within the system so that the optimum degree of control is obtained over the service required.

It will thus be seen that it will be possible when incorporating selector valve mechanisms according to this invention in such hydraulic systems to control the pump output pressure, irrespective of the quantity of flow required from the pump, up to a maximum designed capacity such that the pump output pressure never exceeds a predetermined amount above that pressure required by the service being operated.

A selector valve mechanism according to the present invention comprises a body having formed therein at least five ports and a valve slidable in said body, said valve being bored to provide therein a number of intercommunicating passages, one of which, on movement of said valve within the body between a number of predetermined limits of travel, can be brought into register with the first port in the valve body between the first limits of travel and in communication through another passage between the second limits with the second port and between the third limits with the third port, the fourth and fifth ports being provided for connection with a fluid pressure supply and a tank respectively.

Preferably the first said passage in said valve mechanism is in permanent communication with the first port so that the first limit of travel is equal to the limit of travel in the valve body.

Seven ports may be provided in the selector valve mechanism body, the sixth port being in register with another of said passages in the valve between the fourth limits of travel of the valve, the seventh port being provided for connection to tank. Preferably there is provided in conjunction with said selector valve mechanism a relay valve having an apertured spring loaded valve member, which relay valve is hydraulically coupled to the first port, to the pump delivery and to tank and is so arranged that it ensures a substantially constant, but low, pressure difference between the pump and the pressure at said first port.

There may also be provided a pilot relief valve in hydraulic circuit with the relay valve. Furthermore, a non-return valve is preferably included in one of the passages of the main valve of the selector valve mechanism. Clearly also a plurality of selector valve mechanisms as described above may be employed connected hydraulically.

Two hydraulic systems incorporating selectors according to the present invention are diagrammatically illustrated in the accompanying drawings; that in FIGURE 1 provides for metering of the liquid flow between the pistons of jacks operating the services of the load side and the pump, whilst that in FIGURE 2 caters for metering between the jacks and tank on the tank side of the pump; the system shown in FIGURE 2 is intended more specifically for use in arrangements in which the controlled lowering of a load is required.

Referring to FIGURE 1 there is shown a circuit for use in fork lift trucks or in any other application where economy of power is required, for example wherein the pump is driven from an electric storage battery or an air storage battery or an hydraulic accumulator. The circuit includes a pump 1 in communication through a line 2 with a relay valve indicated generally at R and through another line 3 through a non-return valve 4 with an inlet 5 to a selector generally indicated at SL2; the line 3 also communicates through a similar non-return valve 6 with an inlet 7 to a second selector SL1.

The relay valve R includes a cylinder R1 in which is slidably mounted an apertured piston R2 slidable within the cylinder against the action of a spring R3. The cylinder has an inlet port R7, communicating through pipe 2 with the pump 1, an outlet port R4 communicating with an hydraulic storage tank (not shown) and an outlet R5 which through a pipe line 8 communicates with an inlet port 9 in the body 10 of the selector SL1. The outlet R5 also is in communication through line 11 with a pilot relief valve 12 the opposite end of which communicates with the tank line from outlet R4. The aperture R6 in the piston R2 is of relatively small diameter.

The selector SL2 including the valve body 10 also includes a slide valve 13 having an operating handle 14. The slide valve 13 is provided with a number of lands 15, 16, 17 and two portions 18, 19 of reduced diameter, liquid seals 20 being provided adjacent each end of the valve. The valve is bored as at 21 and in an enlarged part of the bore 21 is a non-return valve comprising a ball 22 spring biassed on to a seat. The bore also has three transverse passageways 23, 24, 25. A passageway 26 is formed in the valve body 10, which passageway communicates with an inlet port 9 in the selector SL1. As the selector SL1 is identical in construction with that of SL2 reference numerals employed in connection with selector SL2 are also used for similar parts in the selector SL1, the only difference being that the passageway 26 in the selector SL1 communicates with tank. The valve body 10 is also provided with ports 27, 28 communicating with the tank and ports S1, S2 communicating with the two sides of an hydraulic jack (not shown) which operates the service selected. In the case of selector SL1 for convenience sake these two ports are numbered S3, S4.

As shown in FIGURE 1 the selectors SL1, SL2 are in the neutral or off position. When the pump 1 is not running, the piston R2 under the bias of its spring R3 will be at the left-hand end of its travel, thus sealing the outlet R4. When the pump is started liquid under pressure passes through the aperture R6, pipe line 8, inlet port 9, passageway 26 in both selectors SL2, SL1 and thence to tank. Flow of liquid under pressure through the aperture R6 creates a pressure difference between the inlet R7 and outlet R5, so that the piston R2 moves towards the right uncovering the outlet R4 to tank; hence liquid under pressure from the pump can flow to tank through outlet R4 and through the passageway 26 in selector SL1. It will be appreciated that liquid under pressure also passes through the pipe 3 and although it can enter the inlet ports 5 and 7 in the selectors SL2, SL1 respectively it is therein trapped. Since, however there is an open circuit to tank, there is a continuous flow of liquid from the tank through the pump, relay valve, and back to tank.

The aperture R6 provides for a pressure difference between the inlet R7 to the relay valve R and the outlet R5 therefrom. The aperture R6 is so arranged that the pressure difference across it in terms of pounds per square inch is equal to the thrust of the spring R3 when fully extended, that is to say, when the piston R2 is at the full extent of its travel to the left. Any increase in such pressure at inlet R7 will cause the piston R2 to move to the right, thus allowing excess liquid causing this increase of pressure to flow back to tank. It is to be appreciated that the amount that the outlet R4 is opened still depends upon the amount of excess liquid required to be disposed of in order to maintain the predetermined pressure difference across the piston R2. The outlet R4 is therefore arranged so that it is capable of passing together with the aperture R6 the maximum quantity of liquid that the pump is capable of delivering.

With the selectors SL1, SL2, therefore in the neutral position that is to say one in which no services are being supplied, the neutral or idle pump output pressure is limited and hence the power required is maintained at a minimum.

It is now assumed that selector SL2 is operated through the operating handle 14 to cause the valve 13 to move towards the left. As movement of the valve 13 in the body 10 commences a land 29 on the valve causes partial blocking of flow to the selector SL1. This creates a throttling of flow of liquid through the inlet 9 to cause a pressure rise in the line 8. Such pressure rise upsets the pressure difference across the piston R2 and the spring R3 forces the piston R2 to the left, thus tending to close outlet R4 allowing the pressure to rise at the relay valve inlet; further movement of the valve 13 to the left causes the port S1 to be connected to tank outlet 28 through an annular groove 30 provided by the reduced portion 19 of the valve. Further fractional movement of the valve 13 to the left causes the passageway 24 to be connected to the outlet S2 and at the same time land 29 has almost completely sealed communication between the inlet 9 and passageway 26. When the passageway 24 is fully open to outlet S2, the said communication is completely sealed, so that liquid under pressure can no longer flow through the pasageway 26 to the port 9 in the selector SL1 and thence to tank.

Due to this fact the spirng R3 moves the piston R2 to the left, so that the outlet R4 is closed, thus allowing pump pressure to build up until it can overcome any pressure in the bore 21, due to the load on the service seelcted, this pressure being built up in the bore 21 as soon as the passageway 24 is open to outlet S2, this pressure maintaining the ball 22 on its seat. When these conditions attain, a small flow up to the maximum quantity which the aperture R6 will pass, is allowed to pass to the service S2 through the passageway 23, opening the ball valve 22, through the bore 21 and passageway 24 to outlet S2, thus giving a very small or creep operation of the service S2. Any excess pressure built up on the inlet to the relay valve R above that required to operate the service selected, alters the pressure difference across the piston R2 and causes the piston R2 to move to the right opening the outlet R4 to tank, and so bleeding off excess pressure. This therefore maintains the pump pressure always at a predetermined amount above that required by the load and thus effects a saving in power required.

That portion of the land 16 to the right of the passageway 24 is preferably shaped or chamfered so that progressive opening of the outlet S2 to the annular groove 31 in the valve is obtained, thus giving a progressive rate of flow or metering effect upon further movement of the valve 13 to the left. As soon as communication is established between the groove 31 and the outlet S2, communication is established between the inlet 5 and the outlet S2 and pump delivery through the line 3 can now in addition pass to the outlet S2 and supply up to the maximum pump delivery directly to the service selected, the only limit being the metering effect of the land 16. The passageway 24 is, of course, still in communication with the outlet S2, thus still maintaining a pump pressure at the predetermined level above that required by the service S2 until the valve 13 has almost reached its maximum travel to the left. The last part of the movement of this valve brings the passageway 24 beyond the outlet S2 to the left and therefore communication between the said pasageway and outlet is cut off, so that maximum pump pressure is applied at inlet 5 since the relay valve has been rendered inoperative; as there can now be no flow through the aperture R6, the spring R3 causes the piston R2 to seal the outlet R4, so that the pressure on the inlet R7 is equal to that at the outlet R5. The pilot relief valve 12 prevents any overload on the pump. When these conditions are fulfilled the service selected is operated at full pressure.

It will, of course, be appreciated that whilst the pump is delivering pressure liquid through the non-return valve 4 to the service S2, it is also applying fluid pressure through the non-return valve 6 to the inlet 7. As, however, the valve 13 of selector SL1 is in its neutral position as shown in FIGURE 1, such liquid is trapped in the annular groove 31. However, should it now be desired to select either service S3 or S4 the valve 13 of selector SL1 is moved in the required direction to operate said service, although no initial creep operation is attainable.

If the selector SL2 is operated so as to select service S1 instead of service S2, that is to say the valve 13 is moved to the right, flow of liquid under pressure from selector SL2 to the selector SL1 is prevented as the passageway 26 is again sealed.

It will, of course, be appreciated that whilst operating service S2 in selector SL2 as previously described, it is possible by operation of the selector SL1 simultaneously to operate either service S3 or S4 according to the direction of movement of the valve 13 of selector SL1. Thus movement of the selector valve 13 of selector SL1 to the right allows flow through the line 3, inlet 7, annular groove 31 to service S3, and similarly if movement is to the left through S4. Whichever of these services is selected, the other communicates with tank.

Referring to the arrangement shown in FIGURE 2, the relay valve and the pilot relief valve are differently situated, the former being of different construction from that shown in FIGURE 1.

The relay valve now comprises a valve body 40 in which is slidable the valve 41 under the influence of a spring 42. The valve body is provided with two inlets 43, 44 respectively and an outlet to tank 45. The head of the valve is provided with small orifice 46 to allow for liquid entering at 43 to pass through the valve head to tank outlet 45 and the valve is also provided with a transverse port 47 which can be brought into and out of register with the inlet 44. The inlet 44 communicates through a line 48 with the pump 1 and also through a branch 49 with the non-return valve 4. A further line 50 branched from line 48 passes to the pilot relief valve 12, the other side of which leads to the pipe line 51 in communication with the relay valve inlet 43.

The pump 1 delivers through a line 52 to the branch lines 49 and also through a line 53 to the inlet port 9 of selector SL1. Neither valve 13 in this arrangement includes within its bore 21 the non-return valve 22, as each bore 21 is connected to the return side of the service jack piston through the passageways 24 or 25 and service outlets S2, S1 respectively.

With the selectors SL1, SL2 in the neutral position as shown, the pump delivers liquid under pressure through the line 52 and 53 to the inlet 9 of selector SL1, thence through the passageway 26 in SL2, line 51 to the inlet 43 of the relay valve. Said liquid then passes through the aperture 46 to tank via line 45. Any increase in liquid pressure at the inlet 43 causes the valve 41 to move to the right opening the port 47 to the inlet 44 and allowing the pump to by-pass to tank. The port 47 and the orifice 46 will pass full pump capacity; thus, as in the arrangement shown in FIGURE 1, a predetermined pump idle pressure is attained providing economy. If it now be assumed that SL1 is operated to move the valve 13 to the left, flow of liquid is throttled at the inlet 9 by the land 15 causing pressure reduction at the relay valve inlet 43, so that the spring 42 moves the valve 41 to close communication through the valve with inlet 44, so that pump pressure rises. As movement of the valve 13 towards the left occurs, communication is established between the passageway 25 and service S1, thereby allowing creep operation of service S1. It will, however, be appreciated that service S1 establishes communication between the jack and tank whilst service S2 establishes communication between the pump and jack. It will be appreciated that initial movement of the valve 13 as referred to above causes the land 15 partially to throttle the inlet 9 in selector SL1, so that there is produced a reduction in flow to the inlet 43 of the relay valve. When the valve 13 of the selector SL1 is moved sufficiently to the left, the passageway 25 commences to register with service S1, so that pressure fluid from the jack flows through the passageway 25, bore 21, passageway 23, passageway 26, line 51 into inlet 43 of the relay valve, thus maintaining the valve 41 in its position in which the inlet 44 is in register with the port 47. Fractionally later service S2 is opened to inlet 7 through the annular groove 31 and under these conditions (following load) pressure at S2 is low and therefore the non-return valve 6 between the branch line 49 and the inlet 7 opens and pump delivery flow is allowed to enter through S2 to the service selected, no cavitation or aeration of liquid occurring. As the pump is only working at a relatively low pressure, economy is attained. Further movement of the valve 13 to the left allows the metering land 54 on the valve progressively to establish communication between service S1 and tank connection 28 through the annular groove 30, thus controlling the rate of flow allowed and hence the speed of operation of the service.

As the valve 13 is moved to the limit of its travel to the left it will be observed that the passageway 25 no longer is in communication with the service S1, the passageway 24 is sealed and the inlet 9 is sealed. It will, therefore, be appreciated that there is no flow of liquid under pressure through the bore 21 or pipe 53 and therefore no flow through line 51 to the relay valve 41; thus, as there is no flow through the orifice 46 the spring 42 pushes the valve 41 to the left, closing communication between the inlet 44 and the transverse port 47. In these conditions the pump is put on load, the maximum flow is attained at inlet 7 of selector SL1 and thence to S2 which is connected to the pump side of the jack. This increased pressure in the jack causes a more rapid operation of the service.

When the service to be operated includes an opposing load of the jack as distinct from a following load it is to be appreciated that the service can only be operated by pressure liquid supplied by the pump to the service selected. Again starting with the selectors in the position shown in the drawing the valve 13 is moved to the right and initially S1 which is connected to the pressure side of the jack will create a flow of pressure through the annular groove 31, inlet 7 and maintain the ball 6 on its seat, so that the service is held. At the same time throttling of the inlet 9 occurs so that a reduction in flow is caused at inlet 43 of the relay valve. Due to this reduction in flow the spring 42 moves the valve 41 so as to disconnect the inlet 44 and transverse port 47, still allowing flow through the valve to tank, but putting the pump on load. This increased load of the pump produces an increase of pressure liquid to cause the ball 6 to open or move away from its seat so that delivery occurs through the inlet 7, annular groove 31 to service S1, so that this service commences to operate. At the same time the passageway 24 is brought into register with the service S2 so that liquid under pressure flows through the bore 21, passageways 23 and 26 to provide a build up of flow again at the inlet 43, so that the valve 41 is operated against its bias to re-establish communication between the transverse port 47 and the inlet 44. When this has occurred, the pump delivers at the same predetermined amount requisite to overcome the opposing force of the load; that is to say the pump delivers liquid under pressure at an amount in excess of that required by the load and therefore the service is operated as selected economically.

Continued movement to the right of the valve 13 causes a land 55 on the valve 13 to allow flow of liquid through the service S2, annular groove 32 to tank connection 27. The land 55 provides metered control of flow on the tank side of the jack. When the valve 13 reaches the limit of its travel to the right the passageway 24 passes the service line S2 so that the passageway 24 is sealed, so that there is no flow through the bore 21, passageways 23 and 26 and orifice 46 of the relay valve. The spring 42 then returns the valve 41 to the position shown in the drawing, so that maximum pump delivery occurs through upper branch line 49, ball valve 6, by inlet 7 and groove 31 to service S1, allowing maximum speed operation of the load. Relief valve 12 prevents pump overload.

As so far described it will be appreciated that only selector SL1 has been operated. Assuming the load still to be an opposing load and selector SL1 operating as described above and selector SL2 is operated by moving the valve 13 to the left, liquid flow from the pump through line 52 forces valve 4 of selector SL2 off its seat, passes through the inlet 5 and annular groove 31 to pass out through service S4. Simultaneously service S3 is connected to passageway 25 and therefore return flow from the jack enters the bore 21 and flows through the passageways 23 and 26 to enter the relay valve inlet 43. The valve 41 therefore moves towards the right against the action of the spring 42 until communication is established between the transverse port 47 and inlet 44. This allows excess pump pressure to bleed off through inlet 44 port 47 to outlet 45. This initial registration of inlet 44 and port 47 causes the operation of service S1 to cease because the pump is off loaded. It will thus be appreciated that unless collapses of service S1 is to occur the load of service S4 must be greater than the load of service S1. Further movement of valve 13 of selector SL2 will give exactly the same operation of selector SL2 as does the service selector SL1.

If the selector SL2 is operated to select a service including a following load the pump 1 is always being off loaded and therefore the selector SL1 can never in these conditions operate an opposing load service. With both selectors SL1 and SL2 operating a following load, flow through the passageway 26 is prevented by the lands on the valve and hence no flow of liquid can occur through the bore 21 of selector SL1, so that the selector SL2 becomes the master selector and operation of service S1 or S2 is provided when the metering lands 54 or 55 are brought into register with the service S1 or S2 respectively.

It is also to be appreciated that if the selector SL1 be controlling either a following or opposing load selector SL2 can also control simultaneously either such load.

Although in the above description reference has only been made to two selectors in series, it will be obvious that any desired number of selectors can be coupled in series and function accordingly.

What we claim is:

1. A selector valve mechanism for controlling a service to be operated by delivery of fluid under pressure from a pressure source and exhausting fluid from said service, said mechanism comprising a valve body provided with a first port connectable to the pressure source, a second port, a third port communicable with the service to be operated, a fourth port communicable with said pressure source, and a fifth port communicable with exhaust; a valve member movable within said valve body and being formed with lands and intercommunicating passages opening outwardly through said lands, said ports, lands and passages being so relatively located that in a first position of said valve member said first and second ports communicate with one another, said first port communicates with a first of said passages and said fourth and fifth ports are blocked against fluid flow therethrough, in a second position of said valve member said third port registers with a second of said passages while said first port remains in communication with said first passage, and in a third position of said valve member said first and second ports are disconnected from one another and said passages are cut off from fluid flow therethrough; a pressure operable relay valve for controlling communication between said source, the interior of said valve body and the exhaust; means including a pressure chamber for operating said relay valve; and means providing communication between one of said first and second ports and said relay valve pressure chamber, said last named means also providing communication of said pressure chamber with said third port when said valve is in said second position thereof.

2. A selector valve mechanism according to claim 1 in which said valve member is movable to a fourth position in which said fourth port communicates with said third port, said first passage registers with said first port, and said second passage registers with said third port; said first port being the one of said first and second ports which communicates with said pressure chamber, said third port communicating with said pressure chamber when said valve member is in its second and fourth positions for controlling said relay valve to maintain the source pressure slightly higher than the pressure in the pressure chamber.

3. A selector valve mechanism according to claim 2 in which said valve body has a sixth port connectable to a service to be operated; and a seventh port connectable to exhaust, said valve member being movable to a fifth position in which said first and second ports are disconnected from one another and said passages are cut off from fluid flow therethrough.

4. A selector valve mechanism according to claim 3 in which the pressure source is constituted by a pump and in which the relay valve includes an apertured spring loaded valve member, said relay valve being hydraulically coupled to the first port, to the pump delivery and to exhaust and ensuring a substantially constant but low pressure difference between the pump and the pressure at said first port, said mechanism further including a relief valve for relieving pump discharge pressure when said first port communicates with no other of said ports, said relay valve then enabling the pump pressure to rise to the pressure determined by said relief valve.

5. A selector valve mechanism according to claim 3 further including metering means in said valve member.

6. A selector valve mechanism according to claim 3 further including a non-return valve in said valve member.

7. A selector valve mechanism according to claim 3 further including a non-return valve in association with said fourth port.

8. A selector valve mechanism according to claim 2 in which the pressure source is constituted by a pump and in which the relay valve includes an apertured spring loaded valve member, said relay valve being hydraulically coupled to the first port, to the pump delivery and to exhaust and ensuring a substantially constant but low pressure difference between the pump pressure and the pressure at said first port.

9. A selector valve mechanism according to claim 8 and including a relief valve in hydraulic circuit with said relay valve.

10. A selector valve mechanism according to claim 2 further including a non-return valve in association with said fourth port.

11. A selector valve mechanism according to claim 1 in which the pressure source is constituted by a pump and in which the relay valve includes an apertured spring loaded valve member, said relay valve being hydraulically coupled to the first port, to the pump delivery and to exhaust and ensuring a substantially constant but low pressure difference between the pump pressure and the pressure at said first port.

12. A plurality of selector valve mechanisms according to claim 1, in combination with means connecting said valve mechanisms hydraulically in series, the second port of each mechanism being connected to the first port of the succeeding mechanism, the second port of the last mechanism being connected to exhaust.

References Cited in the file of this patent

UNITED STATES PATENTS

| 1,775,856 | Hauser | Sept. 16, 1930 |
| 2,354,562 | Webb | July 25, 1944 |
| 2,894,492 | Ziskal | July 14, 1959 |

FOREIGN PATENTS

| 560,412 | Canada | July 15, 1958 |